United States Patent [19]

Tran

[11] Patent Number: 4,785,412
[45] Date of Patent: Nov. 15, 1988

[54] DOUBLE PRECISION APPROXIMATE QUOTIENT NETWORK

[75] Inventor: Richard H. Tran, Minneapolis, Minn.

[73] Assignee: Control Data Corporation, Minneapolis, Minn.

[21] Appl. No.: 75,488

[22] Filed: Jul. 20, 1987

[51] Int. Cl.$^4$ ............................................... G06F 7/52
[52] U.S. Cl. .................................................. 364/761
[58] Field of Search ..................... 364/761, 764–767, 364/715, 736

[56] References Cited

U.S. PATENT DOCUMENTS 3,777,132 12/1973 Bennett, Jr. ......................... 364/765
4,488,247 12/1984 Inagami et al. ..................... 364/765

Primary Examiner—Gary V. Harkcom
Assistant Examiner—Tan V. Mai
Attorney, Agent, or Firm—Robert M. Angus; Joseph Genovese

[57] ABSTRACT

A double precision approximate quotient network determines the quotient of a 2n bit number and an n bit number where the n bit number has a value of $2^{n-1}-2$, $2^{n-1}-1$, $2^{-1}$, or $2^{n}+1$. Apparatus determines the 2's complement and 2 times the 2's complement of the n most significant bits of the 2n bit number. A select circuit is responsive to the value of the n bit number to select one of (a) the 2's complement of the n most significant bits of the 2n bit number, (b) 2 times the 2's complement of the n most significant bits of the 2n bit number, (c) zero, or (d) the n most significant bits of the 2n bit number. A shift register right shifts the 2n bit number one place. An adder adds the shifted 2n bit number to the number selected by the select circuit to determine the quotient. The apparatus is particularly useful in determining a double precision approximate quotient for use in double precision floating point divide and decimal divide operations.

8 Claims, 3 Drawing Sheets

TO DOUBLE PRECISION
FLOATING DIVIDE OR
DECIMAL DIVIDE

| 00111 • • • • • • • • • • 11(10) | SELECT 2's COMP. OF G x 2 |

| 00111 • • • • • • • • • • 11(11) | SELECT 2's COMP. OF G |

| 01000 • • • • • • • • • • 00(00) | SELECT 0 |

| 01000 • • • • • • • • • • 00(01) | SELECT G |

DOUBLE PRECISION APPROXIMATE QUOTIENT NETWORK

FIELD OF THE INVENTION

This invention relates to double precision approximate quotients, and particularly to a double precision approximate quotient network for use in double precision divide networks for digital computer applications employing large words.

BRIEF DESCRIPTION OF THE RELATED ART

The CYBER 180 Model 860 computer, available from Control Data Corporation of Minneapolis, Minn., employs a subroutine for achieving division of a pair of 128 bit words. The apparatus requires, an intermediate step of determining the quadruple precision approximate quotient of two numbers, the approximate quotient thereafter being processed with the divisor and dividend to achieve a correction factor to derive a true quotient which is then processed by the double precision floating point divide or decimal divide, depending upon the setting of a flag. However, the network employed in the aforementioned apparatus requires lengthy multiplication procedures to obtain the quadruple precision approximate quotient. The present invention is directed to apparatus for achieving a double precision approximate quotient for use in large word divide networks which is faster than prior techniques.

It is, therefore, an object of the present invention to provide apparatus for determining an approximate quotient for use in large word divide networks which is faster than prior techniques.

SUMMARY OF THE INVENTION

In accordance with the present invention, apparatus is provided for forming a 2n bit partial product. A 2n bit number, derived from the dividend, is right shifted (divided by 2) and the result is added to a number based on the upper n bits of the 2n bit number selected on the basis of the value of an n bit number. The result is added to a number derived from the multiplication of the upper n bits of the 2n bit number, and the lower n bits of a number whose upper n bits was the n bit number. The result of the addition is the double precision approximate quotient.

One feature of the present invention resides in the processing of the approximate quotient with the divisor and the processing of the resultant of that operation with the dividend to achieve a correction factor which is added or subtracted with the approximate quotient to derive a final quotient.

Another feature of the present invention resides in the fact that the double precision final quotient may be used for double precision floating divide or decimal divide in the computer.

BRIEF DESCRIPTION OF THE DRAWINGS

The above and other features of this invention will be more fully understood from the following detailed description, and the accompanying drawings, in which.

DESCRIPTION OF THE RELATED ART

Figure 1A:
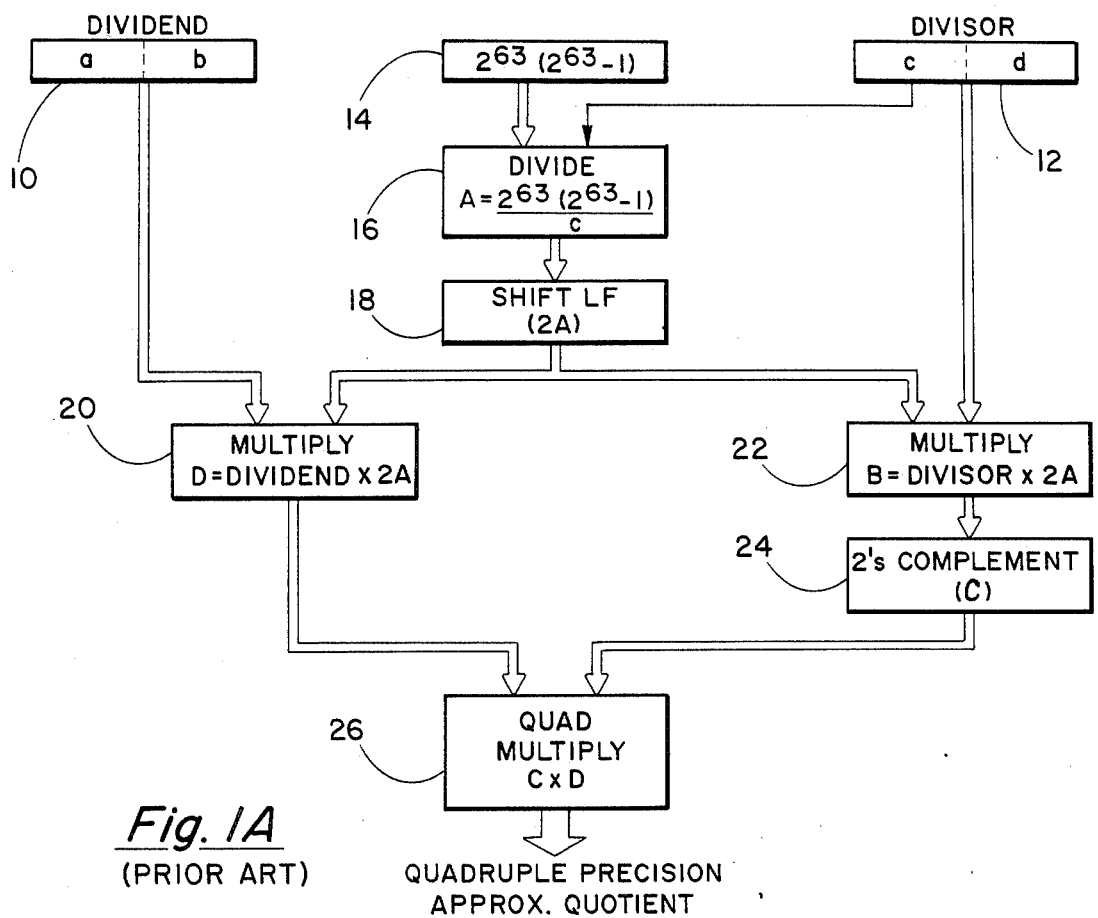
FIGS. 1A and 1B, taken together, illustrate the apparatus according to the prior art of achieving the quadruple precision approximate quotient (FIG. 1A) and the double precision final quotient (FIG. 1B)

Referring to the drawings, and particularly to FIG. 1A, there is illustrated the apparatus for achieving the quadruple precision approximate quotient as employed in the aforementioned CYBER 180 Model 860 computer. As shown in the drawing, the dividend comprises a 2n bit number (in the example, 128 bits) whose upper n bits (64 bits) may be designated by "a" and whose lower n bits (64 bits) is designed by "b". Therefore, the dividend in register 10 may be represented by the number $2^{64}a+b$. Likewise, the divisor in register 12 is represented by a 2n bit number (128 bits) whose upper n bits (64 bits) comprises the number designated by "c" and whose lower n bits (64 bits) is designed by "d"; therefore, the divisor is represented by $2^{64}c+d$. Register 14 holds the number $2^{63}(2^{63}-1)$. Divider 16 divides the contents of register 14 by c to achieve a binary number A, and shift register 18 left shifts the result one place to achieve a number 2A. Multipliers 20 and 22 double precision multiply the dividend and divisor by 2A to achieve numbers D and B, respectively Complement 24 2's complements B to achieve number C. Quadruple precision multiplier 26 multiplies C times D and the approximate quotient comprises the upper 128 bits of the result.

Figure 1B:
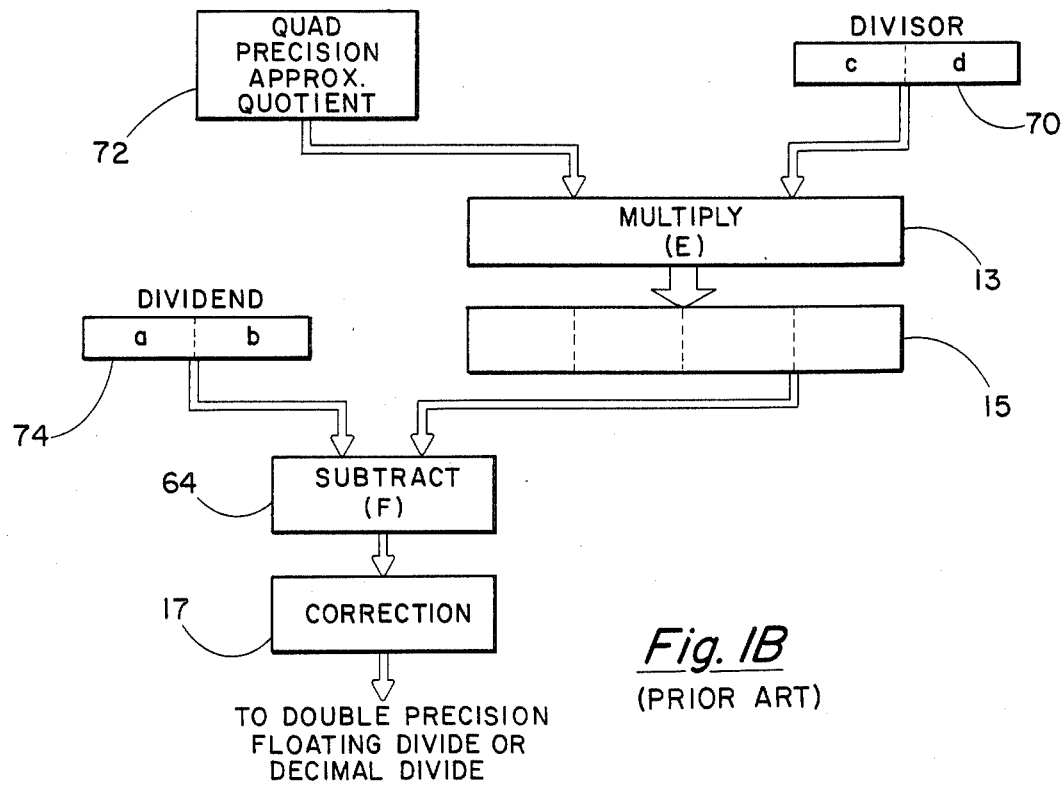

Referring to FIG. 1B, a correction factor was necessary to achieve 96 bit precision for 128 bit dividends and divisors. The 128-bit divisor was right shifted 31 places in register 70 and the approximate quotient from multiplier 26 was right shifted 30 places in register 72. The shifted results were multiplied by multiplier 13 to obtain a quadruple precision resultant E in register 15. The dividend was left shifted 65 places in register 74. The 128 least significant bits of the quadruple precision result E in register 15 was subtracted from the 128 bits in register 74 by subtract circuit 64 to derive correction 17. If the resultant F is positive, the correction term was added to the approximate quotient from multiplier 26 to form the true quotient, whereas if the subtract result F is negative a correction term was subtracted from the approximate quotient to form the true quotient. The result thereupon was forwarded to the double precision floating divide or decimal divide, as the case may be, in accordance with the setting of an instruction flag.

DESCRIPTION OF THE PREFERRED EMBODIMENT

Figure 2A:
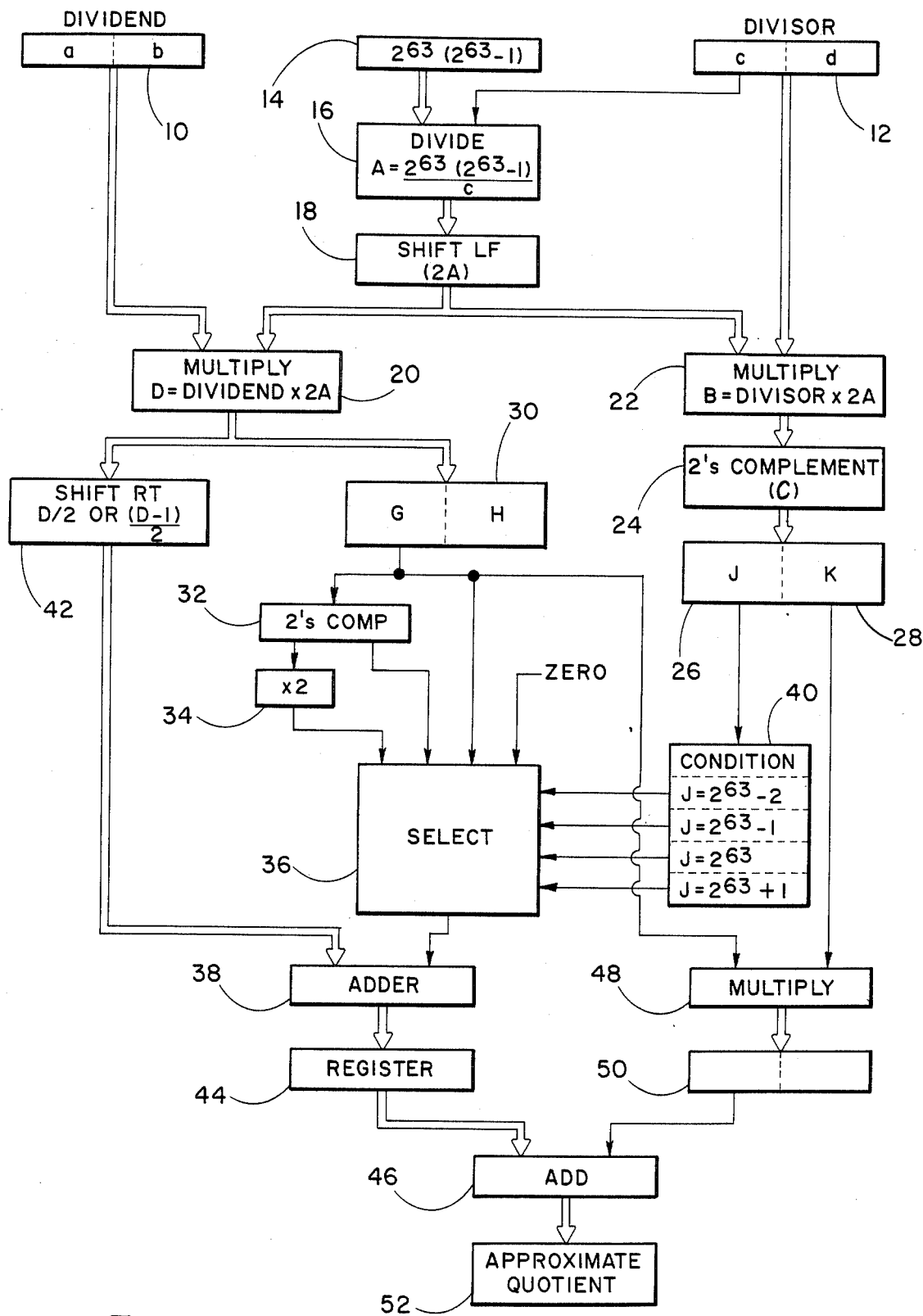
FIGS. 2A and 2B, taken together, illustrate the apparatus for achieving the double precision approximate quotient (FIG. 2A) and double precision final quotient (FIG. 2B) in accordance with the presently preferred embodiment of the present invention.

Referring to FIG. 2A, there is illustrated the process for achieving the double precision approximate quotient in accordance with presently preferred embodiment of the present invention. As in the case of FIG. 1A, the divisor in register 10 comprises a and b as its most and least significant 64 bit numbers, and the divisor 12 comprises c and d as the most and least significant 64 bits. The number $2^{63}(2^{63}-1)$ in register 14 is divided by c by divider 16 and left shifted by shift register 18 to derive a number 2A. Multipliers 20 and 22 multiply the dividend 10 and divisor 12 by the value 2A, the result from multiplier 22 being 2's complemented by complementer 24 to achieve a 128 bit number C and the output of multiplier 20 being a 128 bit number D. To the extent thus far described, the apparatus illustrated in FIG. 2A is identical to that illustrated in FIG. 1A.

The output of multiplier 20 (D) is multiplied by the output of 2's complementer 24 (C). See FIG. 1A. To accomplish this, I have discovered that J, which is the 64 most significant bits of C, will have one of only four possible values: $2^{63}-2$, $2^{63}-1$, $2^{63}$, and $2^{63}+1$. I have further found that G, which is the 64 most significant bits of D, may be arithmetically processed with D/2 to achieve a partial product. In particular, one of the following operations is accomplished, depending on the condition of J:

| Condition | Operation |
|---|---|
| $J = 2^{63} - 2$ | $D/2 - 2G$ |
| $J = 2^{63} - 1$ | $D/2 - G$ |
| $J = 2^{63}$ | $D/2$ |
| $J = 2^{63} + 1$ | $D/2 + G$ |

I accomplish the foregoing selection and operation by processing G through a register 30 to each of 2's complementer 32 and select circuit 36. 2's complementer 32 provides outputs to select circuit 36 and multiplier 34. Multiplier 32 actually is a left shift register to achieve a multiplication by 2 (2G), and provides the result to select circuit 36. The value G, the 2s complement from complement 32 and the 2s complement times 2 from shift register 34 are, together with the value of all zeros, provided as four inputs to select circuit 36, the output of which is provided as one input to adder 38. Select circuit 36 operates on the condition of J from table 40 to select one of the inputs for input to adder 38. Particularly, if $J=2^{63}-2$, the 2s complement×2 of G from shift register 34 is provided as the input to adder 38. If $J=2^{63}-1$, the 2s complement from complement 32 is supplied by selector 36 to adder 38. If $J=2^{63}$, select circuit 36 provides the all zero input to adder 38, whereas if $J=2^{63}+1$, select circuit 36 selects G from register 30 to be inputted to adder 38.

Figures 2B, 3:
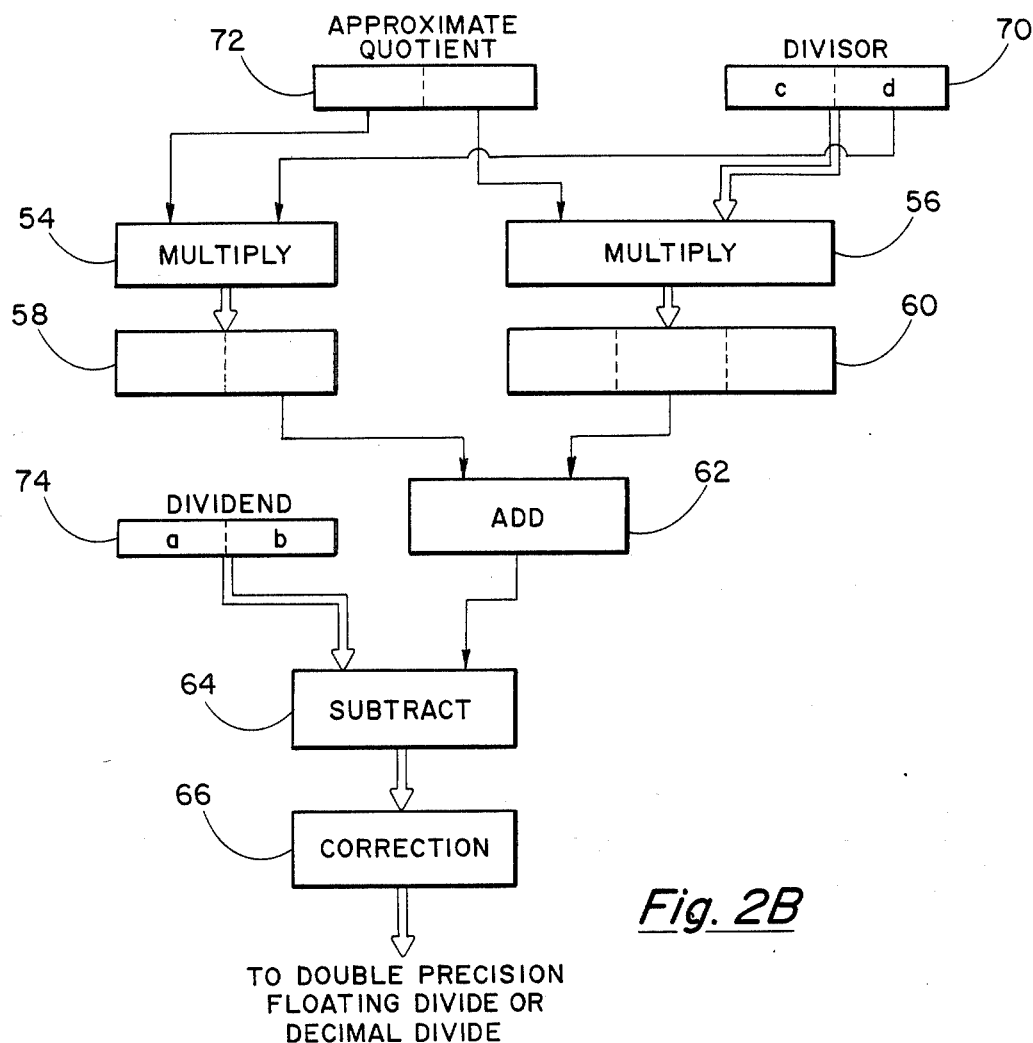
FIG. 3 illustrates the conditions for a select circuit employed in the deriving of the double precision approximate quotient of FIG. 2A.

FIG. 3 illustrates the operation of the table 40 in accordance with the present invention. In each case shown in FIG. 3, the value of J is illustrated. It can be seen by inspection of the contents of register 26 that the two least significant bits of J may be examined to determine the condition of J for select circuit 36. Thus, if the two least significant bits are "10", the 2s complement×2 of G input is selected, whereas if the two least significant bits of J are "11", the 2s complement of G input is selected. If the two least significant bits of J are "00", select circuit 36 selects all zeros for input to adder 38, whereas if the two least significant bits of J are "01", G is selected for adder 38.

Shift register 42 right shifts D (from multiplier 20) by one place to provide an output equal to D/2 or (D−1)/2, the output of which is provided as the second input to adder 38. The result is provided to register 44, which provides an output to adder 46. It should be noted that adders 38 and 46 could be combined as a single adder. It should also be noted that the arithmetic subtraction of G or 2G from D/2 as indicated in the foregoing table is accomplished by adding the 2's complement or twice the 2's complement of G to D/2.

The value of K comprising the 64 least significant bits of C held in register 28 is supplied to multiplier 48, whose second input is the value G in register 30. Multiplier 48 provides a double precision multiply of K and G which is held in register 50. The 64 most significant bits in register 50 are provided as the second input to adder 46. Adder 46 adds the contents of register 44 to the 64 most significant bits of the contents of register 50 to obtain the double precision approximate quotient in register 52.

Referring to FIG. 2B, a correction factor may be obtained to achieve 96 bit accuracy for the quotient (from 128 bit divisors and dividends). In particular, the approximate quotient from register 52 is right shifted 30 places by shift register 72 and the divisor is right shifted 31 places by shift register 70. Multiplier 54 multiplies the 64 most significant bits of the shifted approximate quotient in register 72 with the 64 least significant bits in the shifted divisor in register 70. Multiplier 56 triple precision multiplies the shifted divisor in register 70 and the 64 least significant bits of the shifted approximate quotient from register 72. Register 58 holds the results from multiplier 54 and register 60 holds the results from multiplier 56. The 64 least significant bits in register 58 are added by adder 62 to the 64 middle bits of register 60 (the 64 most significant bits of the 128 least significant bits). The dividend is left shifted 65 places by shift register 74. Subtract circuit 64 subtracts the 64 bit result from adder 62 from the 128 bit shifted dividend from register 74 and provides a correction factor which is either added or subtracted to the double precision approximate quotient from multiplier 52 to achieve the true quotient, as described in connection with FIG. 1B. The result is forwarded to the double precision floating divide or the decimal divide, as the case may be, in accordance with the setting of an instruction flag, as described in connection with FIG. 1B.

One feature of the present invention resides in the fact that the approximate quotient derived by the apparatus illustrated in FIG. 2A achieves a reasonably accurate double precision approximate quotient. Therefore, in applications where less precision is required, the approximate quotient may be utilized alone, or with a slight modification hereinafter described. Particularly, I have found that for use in a double precision floating point divide network, it is necessary only to employ 95 bits of accuracy, rather than 96 achieved with the correction apparatus in FIG. 2B. By adding decimal 5 (binary 0101) to the approximate quotient derive in FIG. 2A, a reasonably accurate 95 bit quotient may be forwarded to the floating point divide for processing. Hence, adder 46 in FIG. 2A can additionally be wired to add binary 0101 to the other arithmetic calculations to achieve an approximate quotient 52 having 95 bits of precision for use in floating point divide operations.

Tests have been conducted on the double precision floating point divide operation for the aforementioned CYBER 180 computer, and on a double precision floating point divide operation employing the quotient network in accordance with the present invention. Results revealed that a double precision floating point divide operation employed between 15.57 microseconds and 16.15 microseconds in the CYBER 180 computer. In contrast, employing a double precision quotient network in 96 bit accuracy in accordance with both FIGS. 2A and 2B of the present invention, the double precision floating point divide operation required between 12.25 and 13.27 microseconds. In the case of a 95 bit accuracy quotient for use in double precision floating point divide employing the approximate quotient of FIG. 2A with the correction factor of 0101, the time required for double precision floating point divide was further reduced to between 9.94 microseconds and 10.57 microseconds Thus, employing the approximate quotient network of FIG. 2A with the correction factor of FIG. 2B, a reduction in time of approximately 20 percent is achieved in a double precision floating point divide. By employing the correction factor of 0101 to the approximate quotient of FIG. 2A, the time required for double precision floating point divide is reduced by approximately 40 percent.

The present invention thus provides apparatus for rapid and effective quotient networks. Although the present invention has been described in connection with multiple arithmetic networks, multipliers and complement networks, in a typical application only one of each type of network may be required For example, if several multiplication functions are required, as indicated at blocks 20, 22, 48, 54 and 56 of FIGS. 2A and 2B, only one multiplier might actually be employed, with the results of each process held in a register for subsequent processing. Further, although the present invention is described in connection with 128 bit divisors and dividends, the invention will work with any 2n bit divisors and dividends. Thus, although the present invention is described where n equals 64 bits, the invention is equally applicable to other bit length numbers.

This invention is not to be limited by the embodiments shown in the drawings and described in the description, which are given by way of example and not of limitation, but only in accordance with the scope of the appended claims.

What is claimed is:

1. Apparatus for determining a 2n bit partial product of a first 2n bit number and a second n bit number, said n bit number having a value equal to one of $(2^{n-1}-2)$, $(2^{n-1}-1)$, $(2^{n-1})$ and $(2^{n-1}+1)$, said apparatus comprising:
    means for right shifting said first number by one bit to derive a fourth number having a value of either one-half of said first number or one-half of said first number minus 1;
    means for determining a third number comprising the n most significant bits of said first number;
    means for multiplying said third number by 2 to achieve a value of twice said third number; and
    means responsive to said shifting means and said determining means and said multiplying means and to the value of said second number for (a) subtracting twice said third number from said fourth number if the value of said second number is $2^{n-1}-2$, (b) subtracting said third number from said fourth number if the value of said second number is $2^{n-1}-1$, (c) selecting said fourth number if said the value of said second number is $2^{n-1}$, and (d) adding said third number to said fourth number if the value of said second number is $2^{n-1}+1$.

2. Apparatus according to claim 1 wherein said multiplying means and said responsive means comprises means for determining the 2's complement of said third number, means for determining twice the 2's complement of said third number, select means responsive to the value of said second number (a) for selecting twice the 2's complement of said third number when the value of said second number is $2^{n-1}-2$, (b) for selecting said 2's complement of said third number when the value of said second number is $2^{n-1}-1$, (c) for selecting zero when the value of said second number is $2^{n-1}$, and (d) for selecting said third number when the value of said second number is $2^{n-1}+1$, and add means for adding said fourth number to the number selected by said select means.

3. Apparatus for determining a 2n bit approximate quotient of a 2n bit dividend and a 2n bit divisor comprising:
    means for deriving a first number equal to 2 times $2^{n-1}(2^{n-1}-1)$ divided by the n most significant bits of said divisor;
    first multiplier means for multiplying said divisor by said first number to derive a result;
    first complement means for determining the 2's complement of the result from said first multiplier means;
    second multiplier means for multiplying said dividend by said first number to derive a result;
    second complement means for determining the 2's complement of the n most significant bits of the result from said second multiplier means;
    determine means for determining 2 times the 2's complement of the n most significant bits of the result from said second multiplier means;
    select means responsive to the n most significant bits of the 2's complement from said first complement means for selecting a value equal to one of (a) the 2's complement from said second complement means, (b) the 2's complement from said determine means, (c) zero, or (d) the n most significant bits of the result from said second multiplier means;
    shift means for right shifting the result from said second multiplier means one place;
    third multiplier means for multiplying the n most significant bits of the result from said second multiplier means by the n least significant bits of the 2's complement from said first complement means to derive a result; and
    adder means for adding the result from said third multiplier means and the result of right shifting by said shift means and the value selected by said select means to determine a 2n bit approximate quotient.

4. Apparatus according to claim 3 further including means for right shifting said approximate quotient and said divisor by predetermined amounts and for left shifting said dividend a predetermined amount, fourth multiplier means for multiplying the n most significant bits of said shifted approximate quotient by the n least significant bits of said shifted divisor to achieve a result; fifth multiplier means for multiplying the n least significant bits of said shifted approximate quotient by said shifted divisor to achieve a result; and arithmetic means for determining the difference between the shifted dividend and the sum of the n least significant bits of the results of said fourth and fifth multiplier means to determine a correction value.

5. Apparatus according to claim 4 further including means for adjusting the value of said approximate quotient by said correction value to achieve a true quotient.

6. Apparatus according to claim 3 wherein said adder means further adds binary 0101 to said approximate quotient.

7. The method of determining a 2n bit partial product of a first 2n bit number and a second n bit number, said n bit number having a value equal to one of $(2^{n-1}-2)$, $(2^{n-1}-1)$, $(2^{n-1})$ and $(2^{n-1}+1)$, said method comprising:
    right shifting said first number by one bit to derive a fourth number having a value of either one-half of said first number or one-half of said first number means;

determining a third number comprising the n most significant bits of said first number;

multiplying said third number by 2 to achieve a value of twice said third number;

determining the value of said second number; and performing one of the following operations:

(a) subtracting twice said third number from said fourth number if the value of said second number is $2^{n-1}-2$, (b) subtracting said third number from said fourth number if the value of said second number is $2^{n-1}-1$, (c) selecting said fourth number if said the value of said second number is $2^{n-1}$, or (d) adding said third number to said fourth number if the value of said second number is $2^{n-1}+1$.

8. The method according to claim 7 wherein the third number is multiplied by 2 and the operations are performed by determining the 2's complement of said third number, multiplying 2's complement of said third number by 2, selecting twice the 2's complement of said third number when the value of said second number is $2^{n-1}-3$, selecting said 2's complement of said third number when the value of said second number is $2^{n-1}-1$, and selecting said third number when the value of said second number is $2^{n-1}+1$, and adding said fourth number to the selected number.

* * * * *